(12) United States Patent
Kane et al.

(10) Patent No.: US 8,217,996 B2
(45) Date of Patent: Jul. 10, 2012

(54) STEREOSCOPIC DISPLAY SYSTEM WITH FLEXIBLE RENDERING FOR MULTIPLE SIMULTANEOUS OBSERVERS

(75) Inventors: Paul J. Kane, Rochester, NY (US); Patrick A. Cosgrove, Honeoye Falls, NY (US); Cathleen D. Cerosaletti, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 965 days.

(21) Appl. No.: 12/212,852

(22) Filed: Sep. 18, 2008

(65) Prior Publication Data

US 2010/0066816 A1    Mar. 18, 2010

(51) Int. Cl.
*H04N 13/04*    (2006.01)
(52) U.S. Cl. ............... 348/55; 348/56; 348/57
(58) Field of Classification Search .......... 348/51, 348/54–60
See application file for complete search history.

(56) References Cited

U.S. PATENT DOCUMENTS

| | | | |
|---|---|---|---|
| 5,781,229 A * | 7/1998 | Zediker et al. ................ 348/51 |
| 5,805,205 A * | 9/1998 | Songer ............................ 348/49 |
| 6,215,579 B1 | 4/2001 | Bloom et al. | |
| 6,535,241 B1 * | 3/2003 | McDowall et al. ............ 348/51 |
| 6,802,613 B2 | 10/2004 | Agostinelli et al. | |
| 6,924,833 B1 * | 8/2005 | McDowall et al. ............ 348/42 |
| 7,001,021 B2 | 2/2006 | Jorke | |
| 7,180,554 B2 | 2/2007 | Divelbiss et al. | |
| 7,204,592 B2 | 4/2007 | O'Donnell et al. | |
| 7,884,823 B2 * | 2/2011 | Bertolami et al. ............ 345/427 |
| 8,094,927 B2 * | 1/2012 | Jin et al. ....................... 382/154 |
| 2003/0113018 A1 | 6/2003 | Nefian et al. | |
| 2003/0197779 A1 | 10/2003 | Zhang et al. | |
| 2005/0190180 A1 | 9/2005 | Jin et al. | |
| 2005/0270367 A1 * | 12/2005 | McDowall et al. ............ 348/51 |
| 2007/0229654 A1 * | 10/2007 | Kusuno .......................... 348/51 |
| 2008/0036854 A1 | 2/2008 | Elliott et al. | |
| 2009/0251531 A1 * | 10/2009 | Marshall et al. ............... 348/42 |
| 2010/0066816 A1 * | 3/2010 | Kane et al. .................... 348/51 |
| 2011/0090413 A1 * | 4/2011 | Liou ............................... 349/15 |
| 2011/0254934 A1 * | 10/2011 | Yoon et al. .................... 348/56 |

FOREIGN PATENT DOCUMENTS

EP    0 708 351 A2    4/1996

OTHER PUBLICATIONS

Peter G. J. Borten; Contrast Sensitivity of the Human Eye and Its Effects on Image Quality; SPIE, 1999, pp. 114-117.
Dhond et al., "Stereo matching in the presence of narrow occluding objects using dynamic disparity search," IEEE, vol. 17, pp. 719-724.

* cited by examiner

*Primary Examiner* — Gregory Todd
(74) *Attorney, Agent, or Firm* — Kevin E. Spaulding

(57) ABSTRACT

A method for display of stereoscopic images defines at least first and second unequal subsets of viewers and provides at least the first subset of viewers with a first decoding device for viewing displayed stereoscopic images. From a single display apparatus, separate images are displayed for each eye of at least the first and second subsets of viewers in a repeated sequence of displaying the image for the first eye of all viewers during a first time interval; displaying the image for the second eye of the first subset of viewers during a second time interval; and displaying the image for the second eye of the second subset of viewers during a third time interval. The first, second, and third time intervals are non-overlapping.

16 Claims, 9 Drawing Sheets

STEREOSCOPIC DISPLAY SYSTEM WITH FLEXIBLE RENDERING FOR MULTIPLE SIMULTANEOUS OBSERVERS

FIELD OF THE INVENTION

The invention relates generally to displays and more particularly to a stereoscopic display system that allows customized rendering for multiple simultaneous viewers according to viewer preferences.

BACKGROUND OF THE INVENTION

Human three-dimensional visual perception, termed stereo vision, is related to the model human observer having two eyes that are located at two slightly different positions and that form two different viewing perspectives. These two different perspectives are interpreted by the brain and, for most people, effectively "fused" to form a single perspective image. This process, often referred to as binocular fusion, operates upon the disparity between the separate images that are simultaneously formed on the two retinas. Of particular effect for binocular fusion is the relative horizontal displacement of objects in the two images. In binocular fusion, a relative depth between objects is derived, resulting in the perception of a single, broad view with depth.

Stereoscopic display systems, in existence for a number of years, are based on the observation that it is possible to simulate three-dimensional (3-D) images for perception by presenting a pair of two-dimensional images separately to each eye, each image offering a different perspective of some captured or simulated scene content. There are a number of examples of 3-D or stereoscopic displays, using various techniques for distinguishing between the image intended for the left eye and the image intended for the right eye. With any type of stereoscopic display system, some type of separation mechanism is needed in order to distinguish the left (L) and right (R) images that appear on a common display, but are respectively intended for the appropriate left and right eyes of the viewers. Left- and right-eye images can be displayed at separate times, can be of different polarizations relatively orthogonal to each other, or can be of different wavelengths. Conventional two-projector systems can use any of these separation schemes as just described. Using various techniques, single-projector digital systems can also use any of these methods.

Time-sequencing systems use a "page flipping" technique and timing for left- and right-eye image separation. Page-flipping alternately displays left- and right-eye images to provide stereo images to one or more viewers wearing shutter glasses that have left- and right-lens opacity synchronized in some manner to the display refresh rates. One example of this type of display system adapted for presenting stereoscopic images to multiple viewers is given in U.S. Pat. No. 6,535,241 (McDowall et al.).

Stereoscopic systems using polarization differences provide the left- and right-eye images using light at respectively orthogonal polarizations. Viewers are provided with polarized glasses to separate these left- and right-eye images. One example of this type of display system using linearly polarized light is given in U.S. Pat. No. 7,204,592 (O'Donnell et al.). A stereoscopic display apparatus using left- and right-circular polarization is described in U.S. Pat. No. 7,180,554 (Divelbiss et al.).

Stereoscopic systems can separate left- and right-eye images by wavelength and provide viewers with filter glasses that are suitably designed to distinguish the appropriate image for each eye. One example of this type of spectral separation display system is given in U.S. Pat. No. 7,001,021 (Jorke).

Stereoscopic systems have thus been developed to take advantage of basic principles of binocular human vision and stereoscopic display using these different approaches for distinguishing images intended for left and right eyes of a viewer and thus for simulating 3-D scene content. As experience with such systems has grown, increased attention has, correspondingly, been paid to psychophysical factors of stereoscopic perception. Considering the viewing population as a whole, it has been found that not everyone has the same perception of synthesized 3-D images. Instead, given 3-D images with left- and right-eye separation provided using any of the techniques just described, there can be considerable differences in perception and fusion of stereoscopic images from one viewer to another. For many viewers, differences in visual information or visual cues, instead of providing stereoscopic cues, can actually lead to user discomfort or to difficulty in fusing the two images, so that the left- and right-eye images are perceived by each viewer as one fused image rather than two separate images.

One difference between the visual information provided by conventional stereoscopic display systems and the real world environment arises from the fact that the viewer of a stereoscopic display must accommodate, or focus, at a single plane in space when viewing a stereoscopic display, while the disparity cues that are provided indicate that the objects are at different planes in space. This presentation differs from the real world visual environment, where the accommodative and disparity cues provide consistent information. This can be significant for stereoscopic viewing, since the vergence of our eyes and their accommodation distance are reflexively linked, often causing accommodation distance to track convergence distance as the two eyes converge to place an important object onto the fovea of each eye.

It is well known in the imaging sciences that there is an upper limit for how much left (L) and right (R) disparity the human visual system can fuse. It is also well understood that some percentage of the population is not able to interpret stereoscopic information and therefore, that people in this group are unable to benefit from the cues provided by a stereoscopic display system. It is also understood that there can be significant individual variability in an observer's ability to comfortably fuse two images that have horizontal disparity, also termed binocular disparity.

Psychophysical testing has demonstrated that the fusional range that is generally common to all users is much smaller than that for some individual users. These research findings are supported by work in optometry, where methods of quantifying the range of convergent and divergent angles that each individual is able to fuse have been applied to understand an individual's visual performance. It is well understood that this range of convergent and divergent angles that can be fused, referred to as an individual's fusional reserve, differs from one person to the next and also varies with differences in the accommodative stimulus that is provided. Importantly, research in this field has shown that some viewers can fuse a large range of convergent angles and a small range of divergent angles while, in contrast, other individuals can fuse larger ranges of divergent angles than convergent angles. Because of this individual variability, if a stereoscopic system is developed to provide comfortable stereoscopic images to all viewers, the range of disparity that can be shown should be limited to a range that includes a large percentage of the viewing population, but, in doing so, will tend to exclude at least some portion of potential viewers.

Addressing this difficulty, commonly-assigned U.S. Patent Application Publication No. 2005/0190180 (Jin et al.) describes flexible rendering of stereoscopic images that is conditioned according to the stereoscopic fusing capability of the observer. This approach addresses the problem of accommodating the ability of a viewer to fuse stereo images by customizing the presentation of an image for a single viewer looking at a single display.

It has been recognized that there can be stereoscopic display applications for which it is useful to alter the perspective image content that is provided to each of a number of multiple viewers. For example, U.S. Patent Application Publication No. 2008/0036854 (Elliot et al.) describes a method of communicating and rendering either stereoscopic images or dual-view images, in which two viewers are enabled to see different images on the same display through temporal multiplexing and proper synchronization between image projection apparatus and electronic shutter glasses. The display apparatus described in the Elliot et al. '6854 disclosure, however, is limited to two viewers only, presents either stereoscopic images or dual-view images for simultaneous viewers, and makes no provision for psychophysical differences or preferences between viewers.

As a general rule, stereoscopic displays, because they must share light between separate right- and left-eye images, suffer from a lack of brightness. This deficiency applies whether these images are differentiated by multiplexed timing, polarization separation, or spectral range separation.

Conventional solutions for stereoscopic viewing by two or more viewers are limited to simultaneously showing either stereoscopic or dual-view images within a viewing session and fail to address the need for adaptation to individuals in its audience. The compromises that have been made in order to provide 3-D viewing with existing solutions, targeting only a portion of the viewer population, mean that a percentage of the audience may be left without the advantages of stereoscopic viewing or may find it visually uncomfortable. Further, conventional solutions are unable to provide stereoscopic images having satisfactory brightness levels to two or more subsets of viewers.

SUMMARY OF THE INVENTION

It is an object of the present invention to address the need for improved stereoscopic image display. With this object in mind, the present invention provides a method for display of stereoscopic images comprising:
  defining at least first and second unequal subsets of viewers;
  providing at least the first subset of viewers with a first decoding device for viewing displayed stereoscopic images;
  displaying, from a single display apparatus, separate images for each eye of at least the first and second subsets of viewers in a repeated sequence that comprises:
    (i) displaying the image for the first eye of all viewers during a first time interval;
    (ii) displaying the image for the second eye of the first subset of viewers during a second time interval;
    (iii) displaying the image for the second eye of the second subset of viewers during a third time interval; and
  wherein the first, second, and third time intervals are non-overlapping.

It is a feature of the present invention that it enables display of multiple stereoscopic images from a single imaging apparatus.

It is an advantage of the present invention that it provides stereoscopic image display that is adaptable for different groups of viewers, each group having different stereoscopic fusing capability.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

Figure 1:
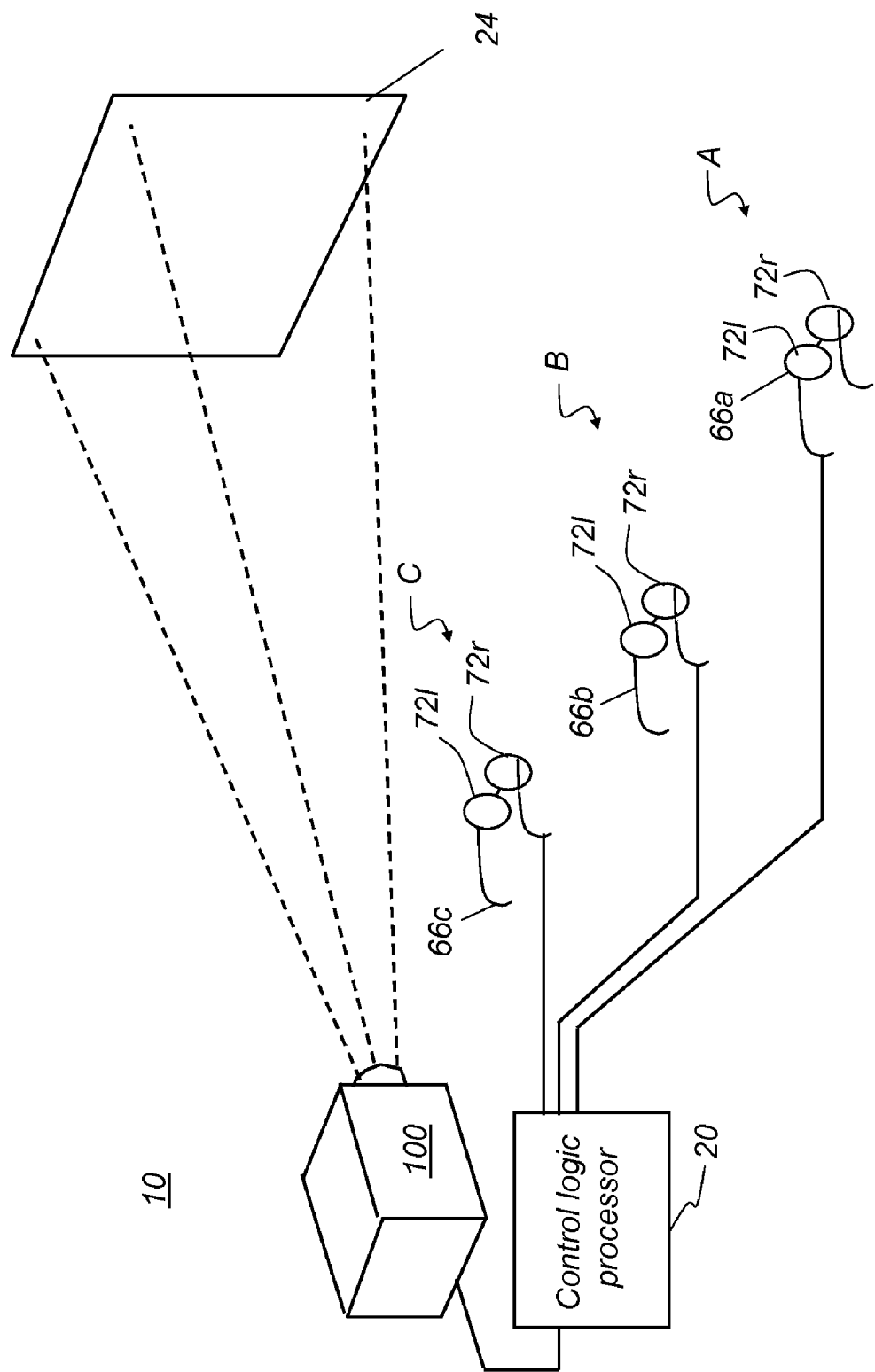
FIG. 1 is a schematic block diagram of a stereoscopic display apparatus.

The present description is directed in particular to elements forming part of, or cooperating more directly with, apparatus in accordance with the invention. It is to be understood that elements not specifically shown or described may take various forms well known to those skilled in the art. Figures shown and described herein are provided in order to illustrate key principles of operation of the present invention and are not drawn with intent to show actual size or scale. Some exaggeration may be necessary in order to emphasize relative spatial relationships or principles of operation.

In the following disclosure, the phrase "left-eye image" denotes the image formed by a display apparatus and intended for viewing by the left eye of the viewer in a stereoscopic display system. Likewise, the phrase "right-eye image" refers to the image that is intended for viewing from the right eye of the viewer. As a convention in the description that follows, initial "L" is used to represent the left-eye image; correspondingly, "R" is used to represent the right-eye image.

In the context of the present invention, the term "spectral range" refers to a single wavelength or to a relatively narrow range of wavelengths of no more than about 40 nm. As described earlier in the background section, spectral stereo vision separation schemes project left- and right-eye images at different wavelengths for each primary color (red, green, or blue, conventionally referred to as R, G, or B) and use filter elements to separate the left- and right-eye image content for each color.

The term "set," as used herein, refers to a non-empty set, as the concept of a collection of elements or members of a set is widely understood in elementary mathematics. The term "subset," unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S. Two subsets are disjointed if their intersection is the empty set, that is, if they have no elements in common. Two subsets A and B are unequal if both B is not a subset of A and A is not a subset of B. In such a case, one or more members of each subset is not a member of their intersection.

In embodiments of the present invention, a single projector is used for displaying stereoscopic images to two or more unequal subsets of viewers. The image scene content that is displayed as left- and right-eye images to each subset of viewers can differ to some degree between viewer subsets. In various embodiments, this difference is based on variable viewer ability to fuse stereoscopic images, so that more or less horizontal disparity is provided for one viewer subset than for another, for example. Here, disjointed viewer subsets are defined according to viewer ability to fuse stereoscopic images. In other embodiments, some or all of the image scene content itself may vary, so that, for example, the scene that displays to viewer subset A is different in content from the scene that displays to viewer subset B. For example, dual-view presentation can be provided so that viewer subset A watches a satellite launching; and viewer subset B watches a sports event. In such embodiments, viewer subsets can be defined by other factors, such as in a gaming application, where viewer subsets A and B each see different content as players of a game. In another embodiment, viewer subset A may be defined by having paid a higher price to view a motion picture in stereo; while viewer subset B may have a correspondingly less vivid view of the same scene content, not in stereo, hence at a lower price. Different levels of image quality or color spectra could be provided for different viewer subsets on different channels. Or, in another cinematic embodiment, two defined viewer subsets A and B may be watching two entirely different motion pictures.

The schematic block diagram of FIG. 1 shows a stereoscopic display apparatus 10 of the present invention that provides stereoscopic display to two or more unequal subsets of viewers. Here, there are three viewer subsets A, B, and C. For this embodiment, a single projector 100 projects images onto a display surface 24, such as a conventional display screen. A control logic processor 20 is in communication with, or part of, projector 100 and is responsive to stored instructions for providing the succession of images to projector 100. Control logic processor 20 provides control signals, which may be wireless, to synchronize the timing of decoding devices 66a, 66b, and 66c used by each viewer subset A, B, and C, respectively.

Each decoding device 66a, 66b, 66c is in communication with control logic processor 20 and is synchronized with the timed sequence of projector 100. Each decoding device 66a, 66b, 66c is actuable to block one or more of the succession of images from any viewer in an alternate subset of viewers.

In the embodiment shown in FIG. 1, decoding devices 66a, 66b, and 66c are electronically controlled shutter glasses, operatively responsive to signals from control logic processor 20 to change the opacity of left and right lenses 72l and 72r in synch with the refresh rate used for providing images on display surface 24.

In the context of the present disclosure, stereoscopic images are presented to viewer subsets on different "channels" or "sub-channels." Thus, the example shown in FIG. 1 has three stereoscopic channels, one for each of viewer subsets A, B, and C.

For L/R image separation, some embodiments of the present invention may alternately use orthogonally polarized light as the distinguishing feature between left- and right-eye images. Polarization can be linear, elliptical, or circular, with the modulated light for the left eye orthogonally polarized with respect to the modulated light for the right eye.

Embodiments of the present invention use a spatial light modulator (SLM) that is capable of high-speed operation compatible with the refresh rates needed with each timing arrangement. Spatial light modulators that can be used for various embodiments of the present invention include the digital light processor (DLP) a digital micromirror device (DMD), developed by Texas Instruments, Inc., Dallas, Tex. Another type of SLM widely used for digital projection is based on liquid crystal technology, available both as a transmissive light modulator, the liquid crystal device (LCD), and as a reflective liquid crystal on silicon (LCOS) modulator.

Linear light modulators can be particularly advantageous for stereoscopic applications because they work well with laser devices, modulate light at high speeds, and can thus provide increased brightness over other types of devices. Among linear light modulators are grating light valve (GLV) designs as described in U.S. Pat. No. 6,215,579 (Bloom et al.) and others. Still other solutions have been proposed using grating electro-mechanical systems (GEMS) devices, such as those disclosed in commonly-assigned U.S. Pat. No. 6,802,613 (Agostinelli et al.).

As described with reference to FIG. 1, embodiments of the present invention provide enhanced stereoscopic viewing capability, with stereoscopic display adapted to the stereo perception characteristics of two or more subsets of viewers. Various techniques are employed in order to provide multiple stereoscopic views as well as, optionally, to provide non-stereoscopic viewing for viewers who do not fuse left- and right-eye images to perceive stereo images.

In order to better understand how timing methods of the present invention offer enhanced stereoscopic imaging, it is instructive to briefly review conventional timing for stereoscopic viewing as currently practiced. Referring to the timing diagram of FIG. 2A, there is shown conventional "page-flipping" timing that is used for stereoscopic display from a single projector. Here, the display of L and R images alternates so that, for example, between time $t_a$ and $t_b$, the left-eye image displays; then, during the next time interval $t_b$ to $t_c$, the right-eye image displays. (The left eye's visibility is blocked by the shutter glasses during right-eye image display; similarly, the right eye is blocked by the shutter glasses during left-eye image display.) Interval timing shown at $w_1$ is equal for both left- and right-eye image display.

Figure 2A:
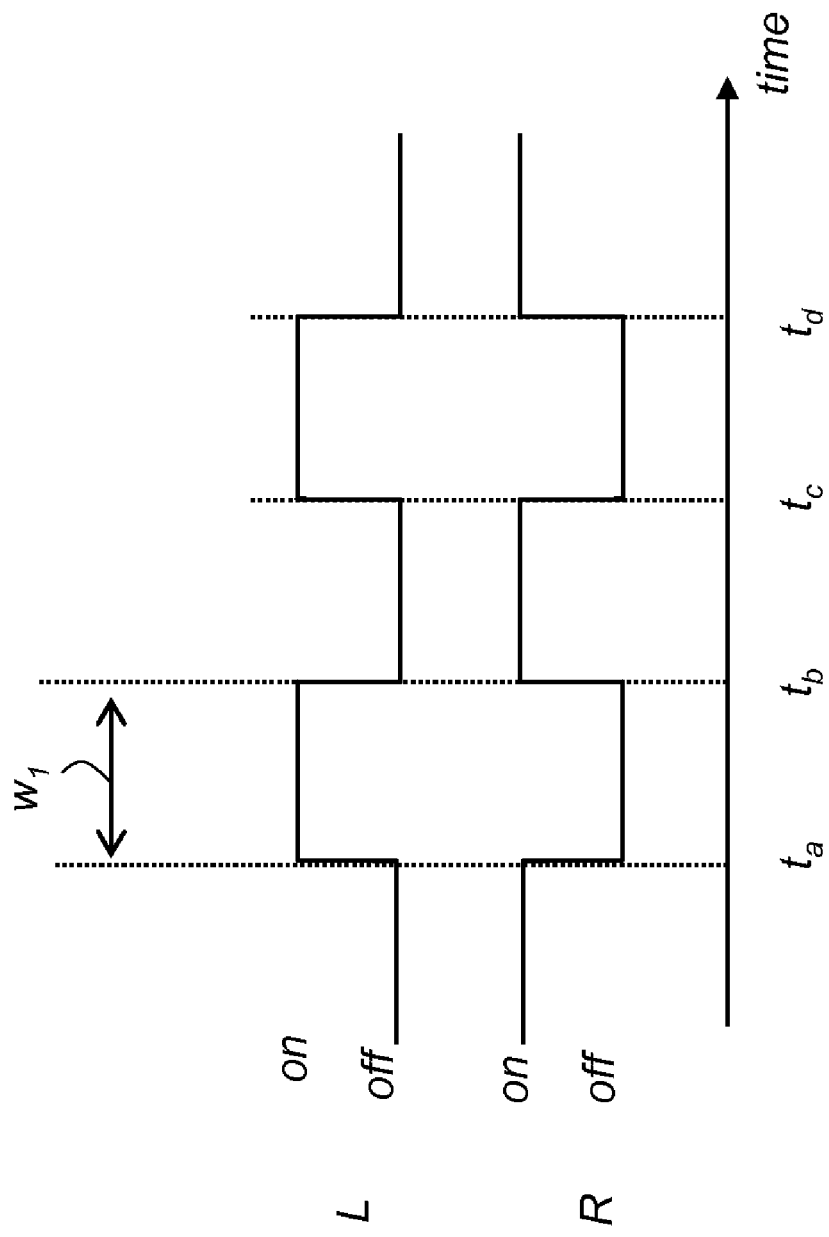
FIG. 2A is a timing diagram for conventional stereoscopic display.
Figure 2B:
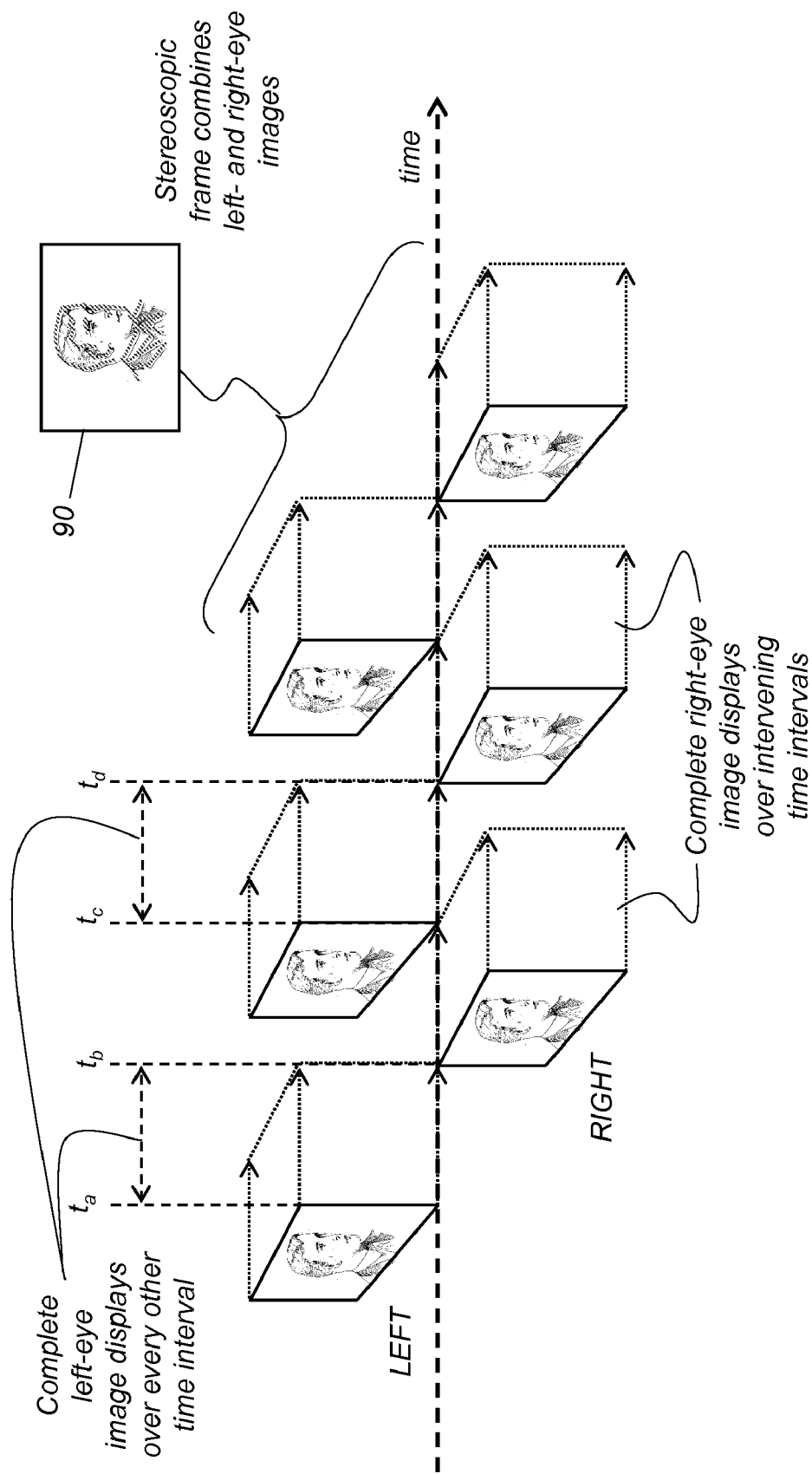
FIG. 2B shows the timing used for conventional page-flipping stereoscopic display.

FIG. 2B shows the page-flipping timing of FIG. 2A in a more graphic form and shows how L and R images are fused by the viewer to form a stereoscopic or 3-D image 90.

Before moving to a description of timing as used in the present invention, it is further instructive to consider the multiplexed timing arrangement that has been proposed for display of stereoscopic images to two subsets of viewers. Referring to the timing diagram of FIG. 3, timing for two subsets of viewers A and B is shown. Annotation is as follows:

$L_A$ indicates timing for the left-eye image to viewer subset A;

$R_A$ indicates timing for the right-eye image to viewer subset A;

$L_B$ indicates timing for the left-eye image to viewer subset B;

$R_B$ indicates timing for the right-eye image to viewer subset B.

Times $t_a$, $t_b$, $t_c$, $t_d$, and $t_e$ demarcate the relative periods of the non-overlapping time intervals for display during one cycle of image presentation to both viewer subsets.

Figure 3:
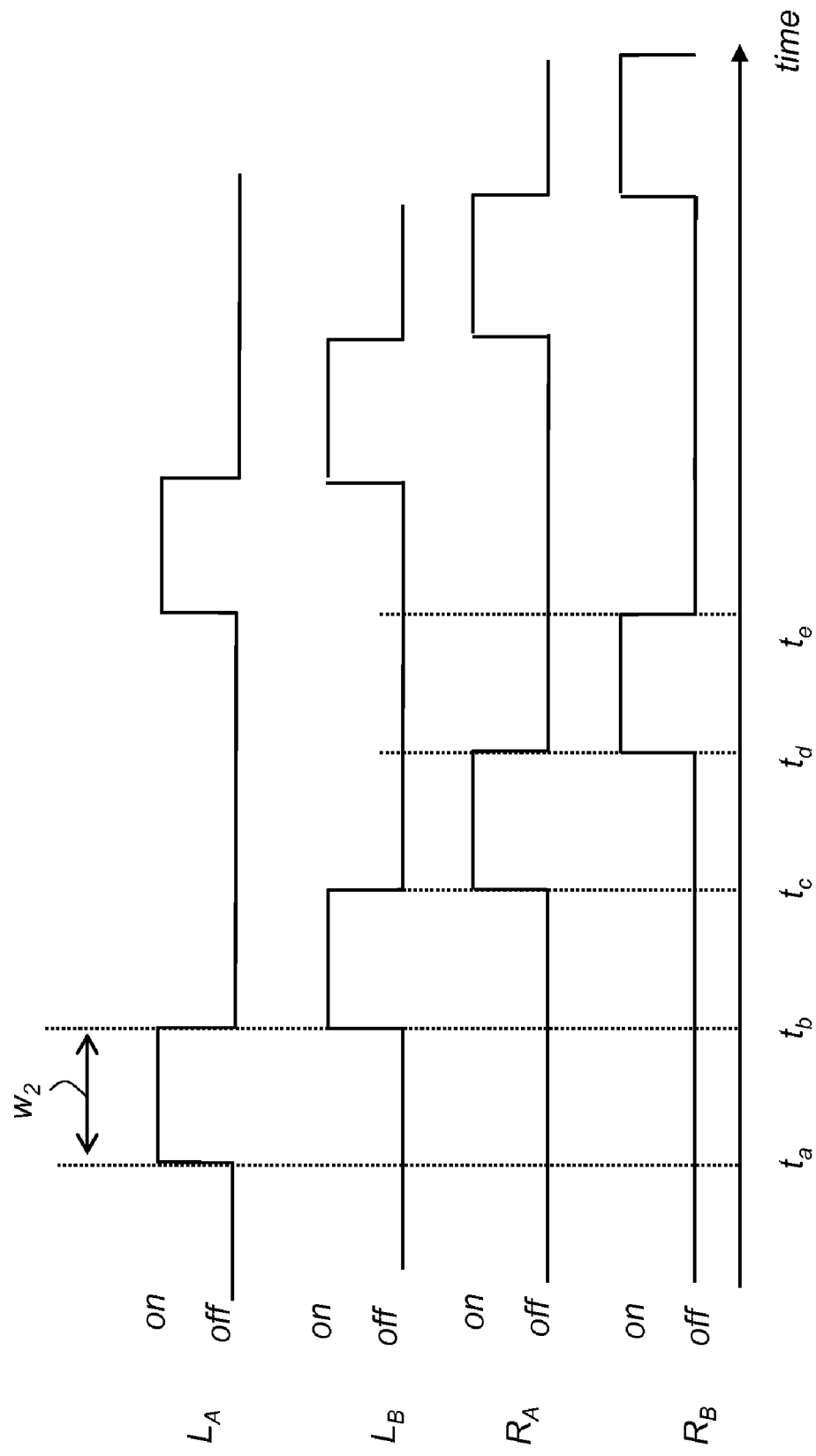
FIG. 3 is a timing diagram showing conventional timing for a stereoscopic display that serves two viewers.

By comparison with the timing shown in FIGS. 2A and 2B, the dual-subset timing example of FIG. 3 presents a significant difficulty that must be addressed in order to achieve satisfactory stereoscopic image quality. With the timing of FIG. 2A for a single viewer or viewer subset, each eye receives only up to about half the available light. To compensate for this inherent lack of brightness, high intensity illumination, such as light available from laser sources, can be used. For dual-subset presentation as in FIG. 3, however, each eye receives only up to about 25% of the available light. Compensation for lack of brightness in this case may well require even additional illumination intensity. To some extent, interval $w_2$ can be shortened, effectively increasing the refresh frequency. However, at any frequency, over a full cycle of stereoscopic presentation only one-fourth of the available light is delivered to a viewer at any instant. While the timing arrangement of FIG. 3 may be feasible, the goal of increasing the number of viewer subsets beyond two by extending this conventional approach is likely to be impractical and may not yield pleasing results. Related, more detailed flicker and brightness analysis pertinent to this problem is provided in subsequent description.

Embodiments of the present invention change the multiplexing scheme for stereoscopic viewing by a repeated sequence that does the following:

(i) display the image for one eye simultaneously to multiple subsets of viewers; then (ii) display the image for the other eye separately to each individual subset of viewers.

In subsequent description, exemplary embodiments are shown that may provide the same scene content to different viewer subsets, varying stereoscopic rendering parameters such as disparity, or may provide different scene content to one or more different viewer subsets while varying stereoscopic rendering for the different subsets.

Embodiments with Same Scene Content and Varying Stereoscopic Rendering

Figure 4:
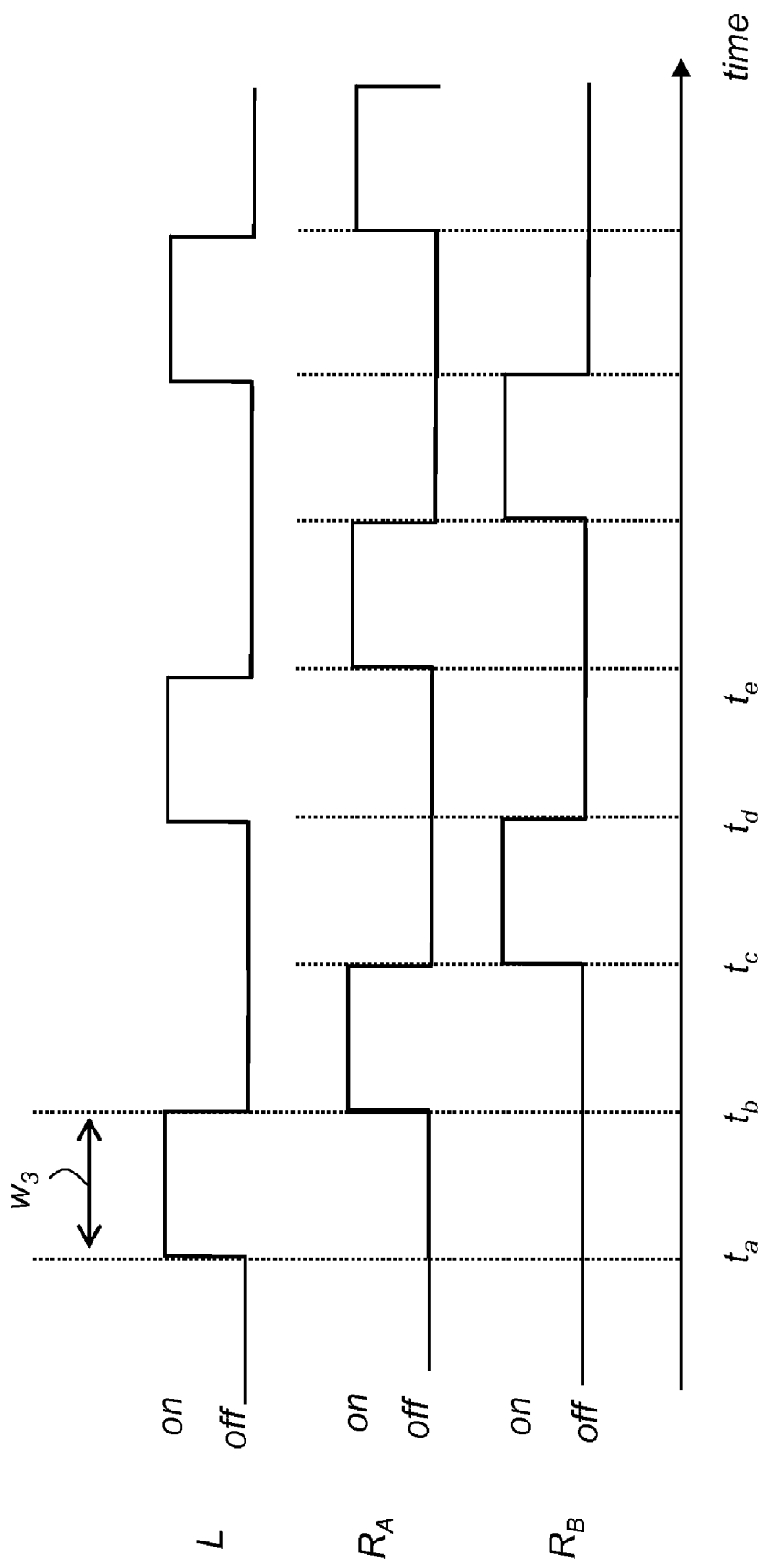
FIG. 4 is a timing diagram that shows a timed sequence for stereoscopic display to two viewer subsets in an embodiment of the present invention.

The timing diagram of FIG. 4 shows an embodiment of stereoscopic imaging for two viewer subsets A and B. With this arrangement, the following repeated, timed sequence is used:

(i) the left-eye image (L) displays simultaneously to both viewer subsets A and B during a first interval, between times $t_a$ and $t_b$;

(ii) during a second interval between $t_b$ and $t_c$, the right-eye image for viewer subset A ($R_A$) displays; then (iii) during a third interval between $t_c$ and $t_d$, the right-eye image for viewer subset B ($R_B$) displays.

By comparison with the conventional timing arrangement for two viewer subsets shown in FIG. 3, the embodiment of FIG. 4 provides modulated light to each viewer subset in two stereoscopic viewing channels for a longer period of time. That is, where the conventional arrangement of FIG. 3 provides 50% of the available light to either viewer subset A or B during one cycle of stereoscopic image display (25% of the time for the L image plus 25% of the time for the R image), the method of the present invention provides about 67% of the available light to each viewer subset (about 33.3% to the left eye and 33.3% to the right eye). Further adjustment of the duration of interval $w_3$ may help to further increase the amount of light delivered during a reference time interval.

The arrangement of FIG. 4 can be used, for example, where the two different viewer subsets A and B have viewers with different capabilities for handling horizontal disparity in stereoscopic images. In one embodiment, for example, viewer subset A exhibits a high relative preference for crossed disparity; viewer subset B, on the other hand, scores very low relative to a measure of crossed disparity. In one embodiment, viewer subset B exhibits no ability for stereoscopic fusion. For any of the different possible disparity/fusion capability groupings, the same image content displays to both viewer subsets, but with different rendering so that different amounts of horizontal disparity are provided.

The pattern used for the alternate timing of FIG. 4 can be extended so that more than two viewer subsets are served simultaneously, from a single projector. Referring to the timing diagram of FIG. 5, there is shown a three-channel arrangement with three viewer subsets A, B, and C. With this arrangement, the following repeated sequence is used:

(i) the left-eye image (L) displays simultaneously to the three viewer subsets A, B, and C during a first interval, between times $t_a$ and $t_b$;

(ii) during a second interval between $t_b$ and $t_c$, the right-eye image for viewer subset A ($R_A$) displays;

(iii) during a third interval between $t_c$ and $t_d$, the right-eye image for viewer subset B ($R_B$) displays; then (iv) during a fourth interval between $t_d$ and $t_e$, the right-eye image for viewer subset C ($R_C$) displays.

Figure 5:
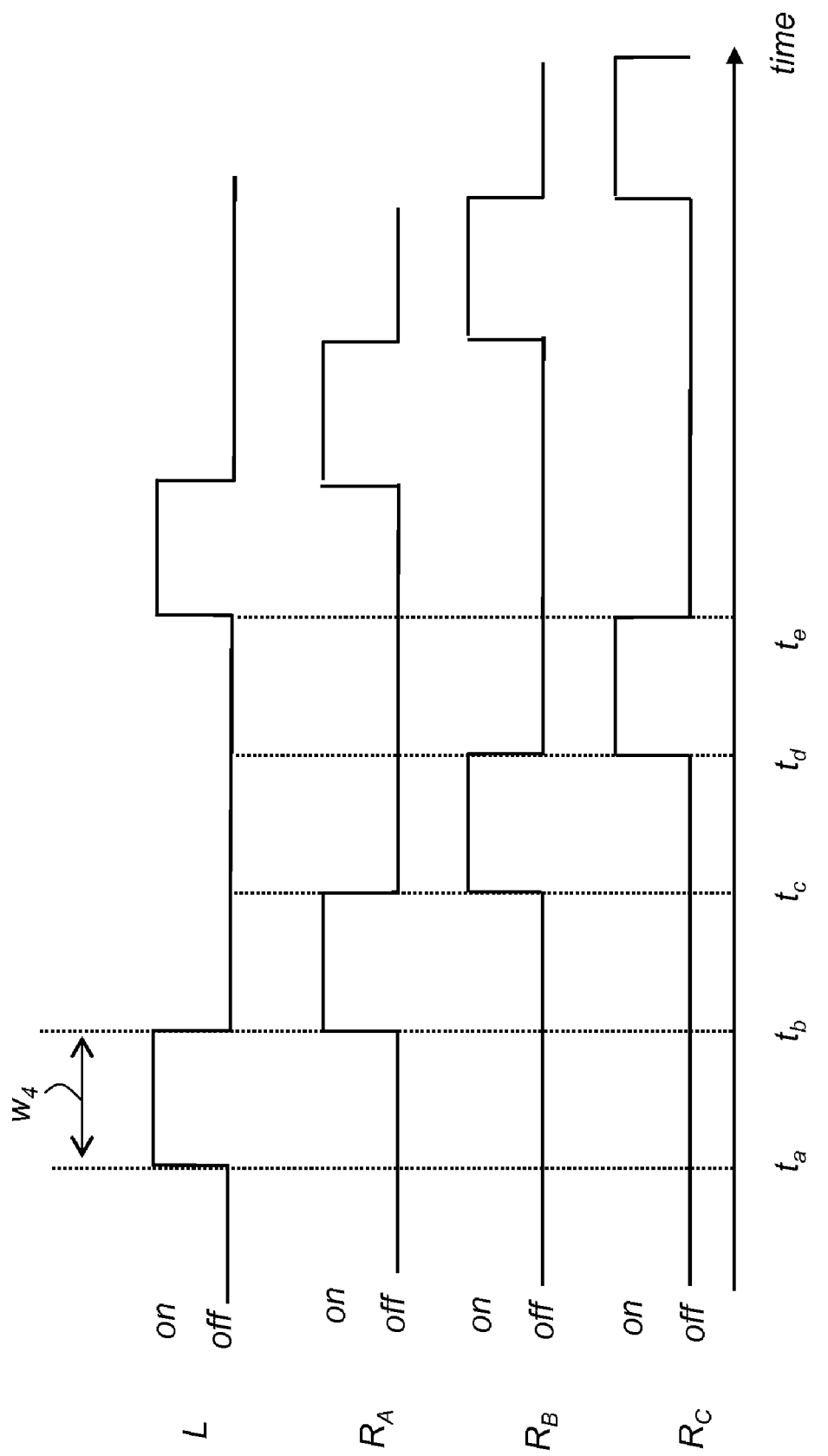
FIG. 5 is a timing diagram that shows timing for stereoscopic display to three viewer subsets in an embodiment of the present invention.

By comparison with the conventional timing arrangement for two viewer subsets shown in FIG. 3, the embodiment of FIG. 5 provides the same amount of light to each of three subsets A, B, and C (that is, 50% of the total available light each cycle) as the conventional timing sequence is able to provide for two subsets. Some amount of optimization is possible by varying the duration of each display interval $w_4$.

Embodiments Varying Both Scene Content and Stereoscopic Rendering

As noted earlier in the background section, conventional single-projector display systems can provide separate left- and right-eye images for either stereoscopic viewing or dual-view presentation, but not for both at the same time. Embodiments of the present invention, however, enable both stereoscopic viewing and dual-view presentation to different viewer subsets at the same time.

Figure 6:
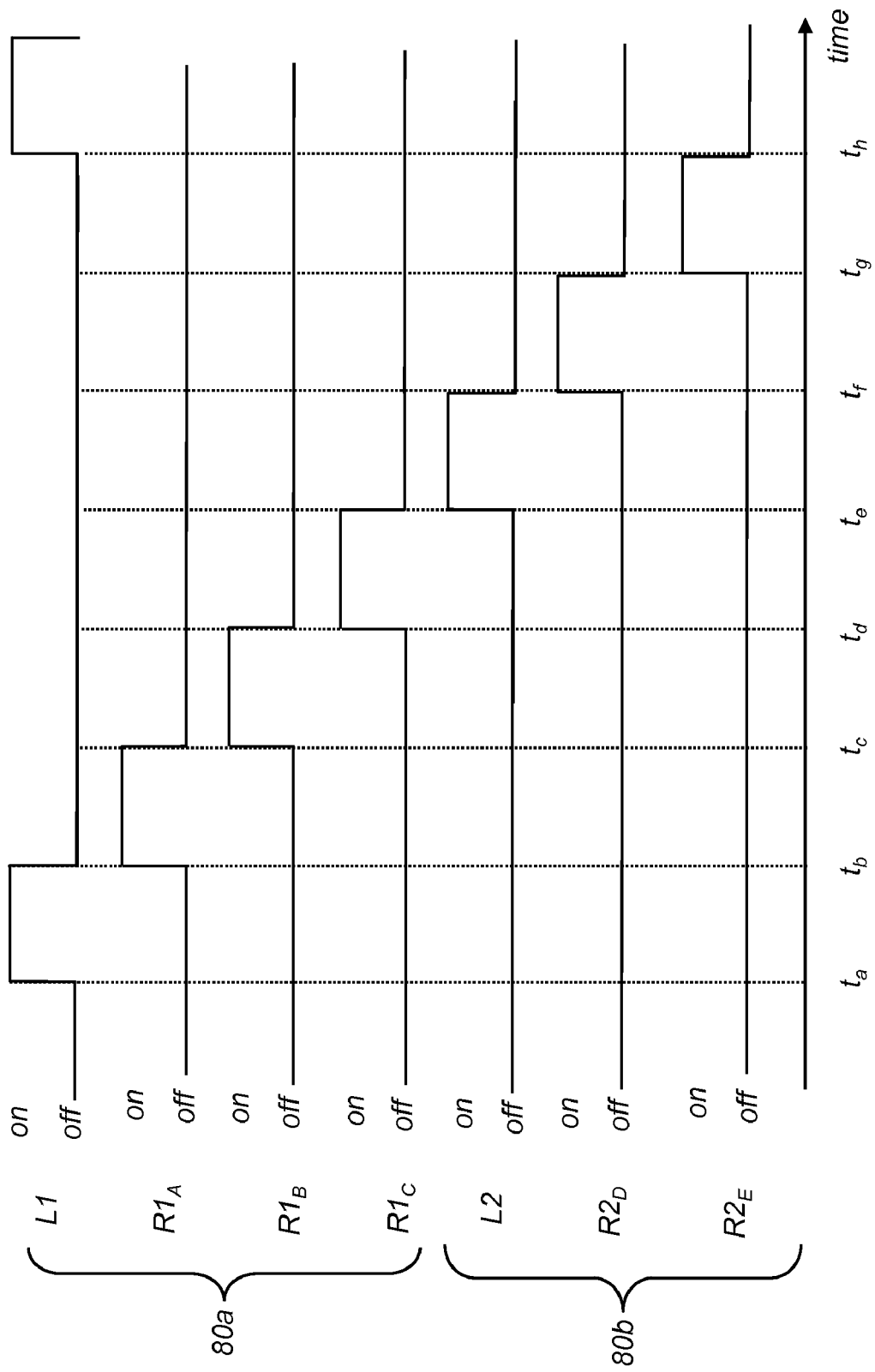
FIG. 6 is a timing diagram that shows the sequence of display timing for stereoscopic display of two different images, with multiple viewer subsets for each image.

The timing diagram of FIG. 6 shows an embodiment with five stereoscopic imaging sub-channels that not only provides, from a single projector or other display apparatus, different scene content to two groups of viewers, but also displays images with different stereoscopic display parameters to different viewer subsets within each group. A first cluster 80a shows timing for display of first scene content to three different unequal viewer subsets A, B, and C on sub-channels A, B, and C. A second cluster 80b shows timing for further display of second scene content, to two different unequal viewer subsets D and E, using the same projection apparatus.

Timing diagrams in first cluster 80a show left-eye image L1 presented simultaneously to each of viewer subsets A, B, and C, in the interval $t_a$-$t_b$. Then, similar to the timing described earlier with reference to the timing diagram of FIG. 5, the right-eye images $R1_A$, $R1_B$, and $R1_C$ for viewer subsets A, B, and C, respectively, are displayed during the next tree time intervals.

Timing diagrams in second cluster 80b show left-eye image L2 presented simultaneously to each of viewer subsets D and E. Then, similar to the timing described earlier with reference to the timing diagram of FIG. 4, the right-eye images R2$_D$ and R2$_E$ for viewer subsets D and E, respectively, are displayed over intervals t$_f$-t$_g$ and t$_g$-t$_h$.

In one embodiment, images presented for clusters 80a and 80b by projector 100 are orthogonally polarized with respect to each other. Decoding devices provided to the different viewer subsets not only provide the needed shutter timing, but also have polarized lenses. Color filters could be similarly utilized in shutter glass decoding devices for separating images for the two clusters.

Flicker and Brightness Considerations

The general technique of placing two or more signals simultaneously on one communication channel, wherein the signals physically take turns on the channel in order to form independent sub-channels, is known in the art as time-division multiplexing, hereafter TDM. For TDM, the temporal domain is divided into recurring intervals of fixed length, each interval corresponding to one sub-channel. As has been shown in the embodiments of the present invention described earlier, the sub-channels can be allocated to left- or right-eye image-pairs for stereoscopic viewing, or to different image content for different viewers or subsets of viewers, or to different renderings of the same image content for different viewers or subsets of viewers, or to various combinations of these.

Using TDM, the inverse of the period in seconds between each recurring interval is the fundamental frequency of the display, also called the frame rate. The frame rate gives the number of full image frames written to the screen or other display surface per second, per sub-channel. Therefore each viewer, while potentially seeing different images or different renderings of images, is presented with images at the same frame rate.

There are necessarily some limitations when using TDM in order to create independent sub-channels for multiple viewers. As the number of sub-channels increases, for example, more demand is placed on the scanning hardware, both electronic and optical, to present each image frame on the display during each sub-channel interval. The sub-channel interval, in turn, decreases as more sub-channels are added. Assuming that this demand can be met, there is a further demand on the display system to output more illumination per unit time, providing increased optical power as more sub-channels are added, so that the image luminance does not decrease. Naturally, this increases the electrical power load in direct proportion. Therefore, a system that can display a single stereo image while drawing 3 W of peak power, that is, a 2 sub-channel system, will need at least 6 W of peak power if expanded to 4 sub-channels, and 12 W of peak power if expanded to 8 sub-channels, in order to maintain the same peak luminance.

Other practical limitations are imposed by the human visual system, such as the problem of image flicker, which has been recognized since the earliest days of motion picture projectors. If the frame refresh rate is too slow, the human visual system detects the periodic fluctuations in screen luminance caused by the on-off projection cycles. This perceptibility has been demonstrated to be a function of the overall screen luminance, the spatial frequency of the image content, and the size of the image in the visual field, as well as the frame rate. Since it is known that flicker sensitivity decreases with decreasing screen luminance, the well-known solution to this problem is to choose a frame rate high enough to eliminate flicker over the expected screen luminance range, usually for a low or zero spatial frequency, to which viewers are most sensitive. The necessary frame rate, which is also the frequency of a flashing light such that no flicker is detectable by a viewer, is called the critical fusion or critical flicker frequency, hereafter CFF.

It might seem that adding more sub-channels to the display system would not change the minimum frame rate since only the time interval per sub-channel is changed, not the number of frames per second per sub-channel. However, the fact that the duration of each frame is shorter when more sub-channels are added also leads to flicker limitations. Thus, flicker limitations are a concern for various embodiments of the present invention.

In recent years, models have become available that can be used to predict the response of the human visual system to various input signals, that is, luminance distributions (This is documented, for example, in *Contrast Sensitivity Function of the Human Eye and its Effects on Image Quality* by Peter G. J. Barten, SPIE Press, 1999, pp. 114-117). Such models are based on extensive laboratory observations of the human visual system capability, wherein such observations are quantified, fitted to mathematical functions and linked together to form a predictive model. Using Barten's Contrast Sensitivity Function (hereafter, CSF) model, predictions of flicker sensitivity for time-varying luminance distributions of varying spatial content can be made. Taking a full-on, full-off flat field as the worst case, the temporal signature of the luminance distribution seen by the viewer is a square wave, with a frequency equal to the frame rate, which is also the number of frames per second per sub-channel. From Fourier analysis of the square wave on a normalized temporal frequency scale (zero to one period), it can be shown that the modulation m of the square wave fundamental is:

$$m = 2 * \mathrm{sinc}(\alpha)$$

where $\alpha$ is the so-called duty cycle of the square wave, or the fraction of time that the signal is in the "on" mode, and sinc(x) is the function sin(x)/x.

Following Barten's analysis, the modulation m is compared against the CSF of the human eye across the temporal frequency spectrum, where the spatial frequency has been set to zero for the case of the flat field. The CSF associated modulation that matches the square wave modulation m identifies the CFF for this modulation. Since the CSF depends on the average illuminance of the signal, the CFF also exhibits a luminance dependence, and thus the CFF is dependent on both the square wave frequency and the screen luminance.

Figure 7:
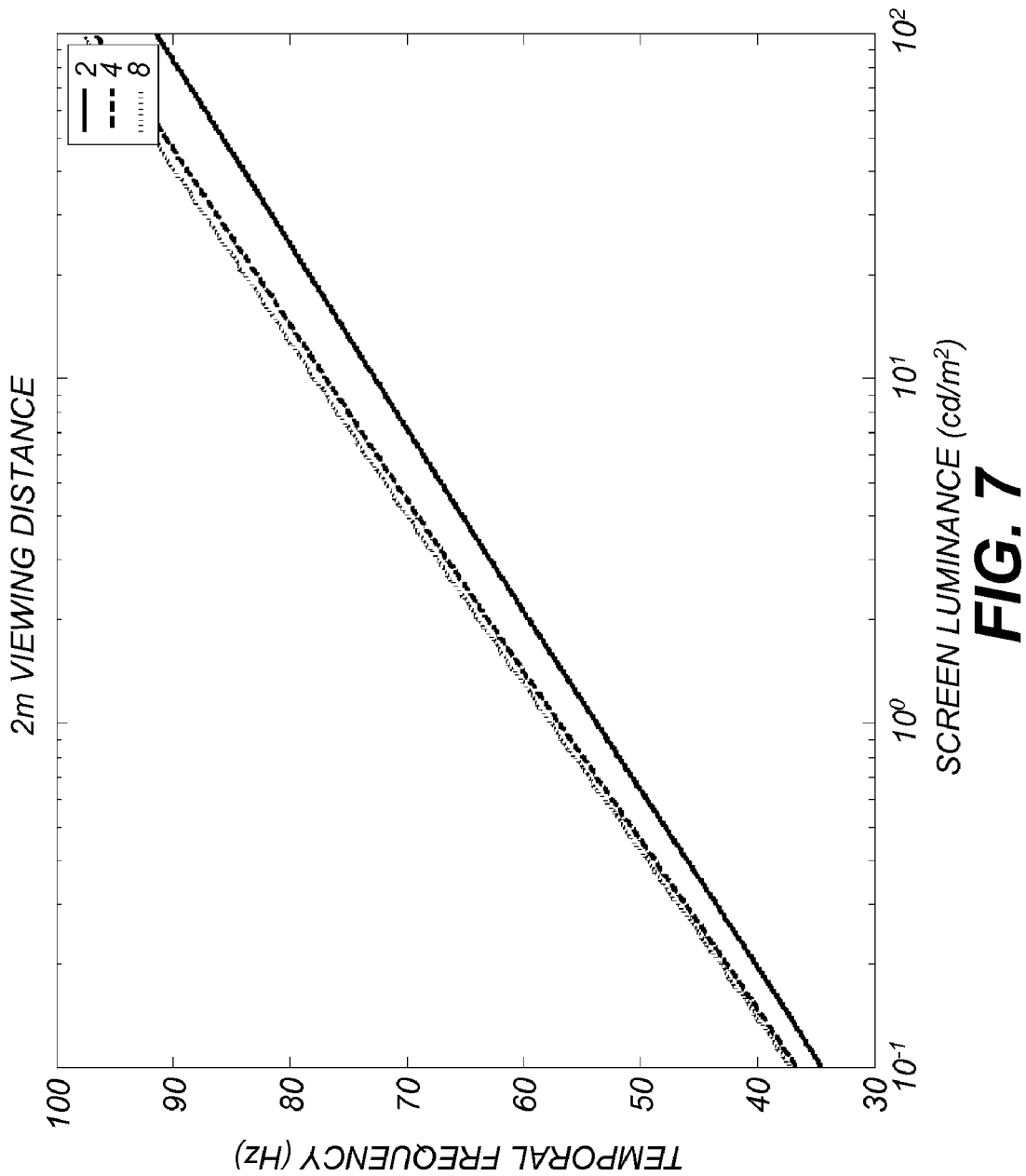
FIG. 7 is a graph showing the temporal frequency for flicker vs. screen luminance for 2, 4, and 8 sub-channels.

With this background, the question of the effect of additional sub-channels on the CFF can now be addressed. Using Barten's model, the graph of FIG. 7 illustrates the CFF versus screen luminance for three different cases, namely 2, 4 and 8 sub-channels. A viewing distance of 2 m from the screen is assumed. The effect of the additional sub-channels is to reduce the duty cycle of the temporal square wave, that is, the presentation time of each frame to each observer. As can be seen from FIG. 7, this has the effect of increasing the CFF slightly at constant screen luminance, although it appears that the effect is reaching a limiting value by 8 sub-channels. For screen luminance levels typical of projection systems, for example, 25 to 100 cd/m$^2$, it appears that frame rates of 60-75 Hz are required for sets of 2 to 8 sub-channels.

There can be a number of bandwidth tradeoffs that need to be considered for stereoscopic display, particularly where more than two viewer subsets have been defined. In order to maintain the desired refresh speeds, for example, display resolution can be reduced during one or more display intervals, both in terms of number of pixels displayed and in terms of number of bits of data per pixel.

The apparatus and methods of the present invention allow simultaneous viewing of stereoscopic or dual-view images by two or more viewer subsets, for images provided from a single projector or display device, with a number of variations. For example, various types of shutter glasses or other decoding devices, shown at 66a, 66b, and 66c in FIG. 1 can be used. Combinations of decoding devices, including shutter glasses, polarizer elements, and spectral filters, can be used for separating left- and right-eye images for different viewer subsets. In any of the embodiments of the present invention, a channel can provide viewing for a set of viewers who do not fuse stereo images. This allows a tradeoff, for example, in which enhanced resolution can be provided for such a viewer subset, instead of altered stereoscopic rendering.

The examples shown in FIGS. 4, 5, and 6 show sequences in which the L image displays as the first image for the first eye to all viewer subsets and separate R images are then provided to each viewer subset. Here, the left eye is arbitrarily designated as the "first" eye, the right eye as the "second" eye. Of course, the alternate arrangement, with R images provided in common and separate L images then displayed for each viewer subset, could also be used.

Defining viewer subsets can be done in any of a number of ways. In one embodiment, a viewer simply tries different pairs of shutter glasses to identify the stereoscopic rendering that seems most suitable. Other methods for profiling viewers to define viewer subsets include the use of an operator interface, such as that described in U.S. Patent Application Publication No. 2008/0190180 cited earlier.

Figure 8:
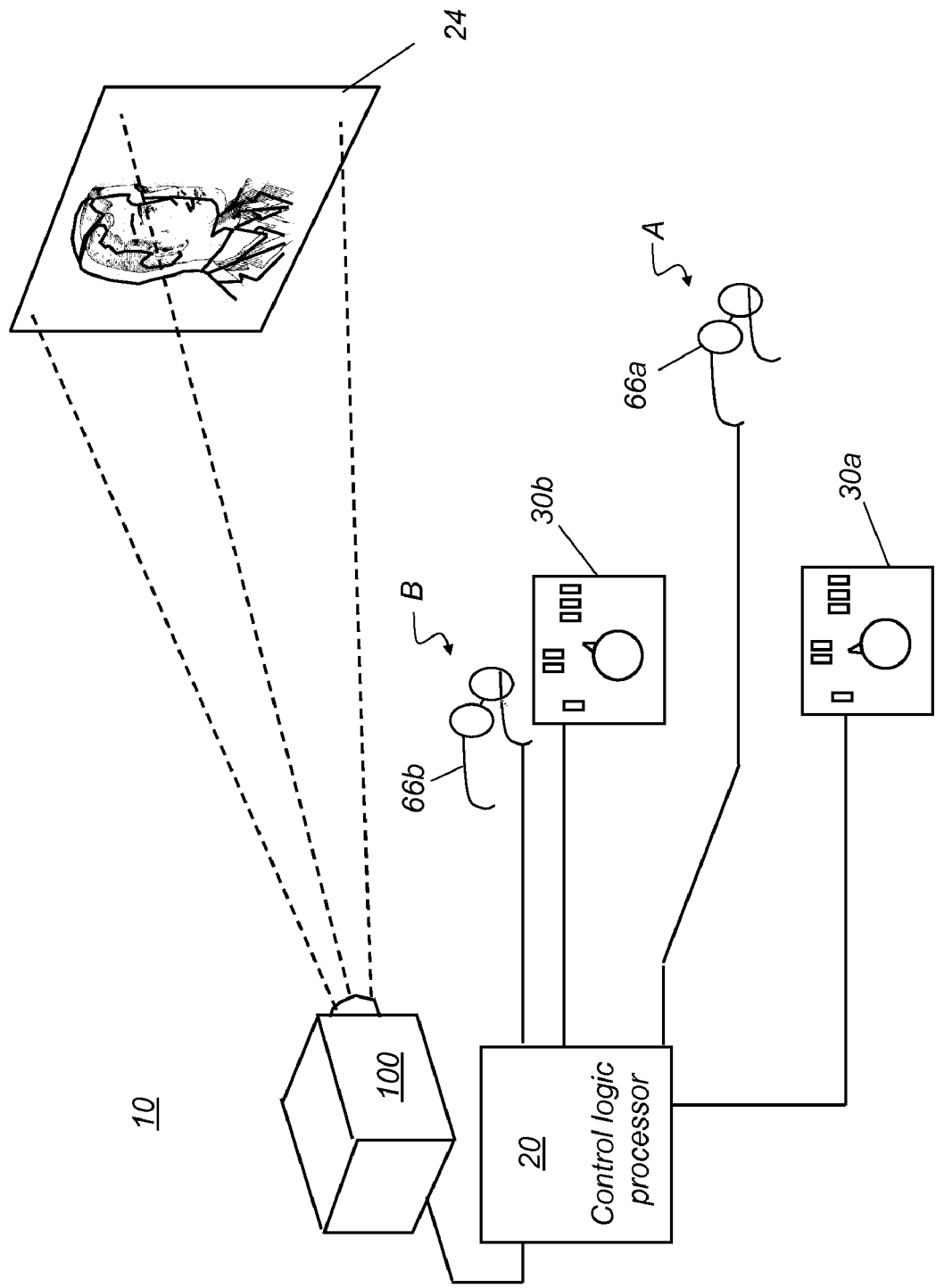
FIG. 8 is a schematic block diagram showing viewer controls used for adjusting horizontal disparity in one embodiment.

The schematic block diagram of FIG. 8 shows an embodiment with two viewing channels, for viewer subsets A and B respectively, in which viewer controls 30a and 30b are provided. Viewer controls 30a and 30b, used for adjusting horizontal disparity in the embodiment shown, allow adjustment of stereoscopic imaging parameters for each individual viewer subset. There are a number of options for providing viewer controls 30a and 30b, including providing separate control boxes or using a computer screen and interface, for example. Appropriate viewer control facilities could be available for each viewer subset, enabling adjustment of settings for each viewer subset. Instructions entered using viewer controls 30a and 30b are stored and used by control logic processor 20 for providing image data in suitable form to projector 100.

Instructions received by control logic processor 20 from viewer controls 30a and 30b may be acted upon immediately to provide continuous feedback to the viewers during projection of the image, in order to arrive at a pleasing image for each viewer. This would allow a viewer or subset of viewer to change horizontal disparity interactively, such as while watching a movie, for example. Alternatively, instructions may be sent to the control logic processor prior to, or at any time during, projection and can be maintained for the duration of the projection. Furthermore, instructions may be stored for any period of time in the control logic processor 20 as a customized profile for a particular viewer or viewers, which can then be recalled and/or reset at a future time.

The invention has been described in detail with particular reference to certain preferred embodiments thereof, but it will be understood that variations and modifications can be effected within the scope of the invention. For example, although described for a projector embodiment, the method of the present invention can be used with any of a number of different types of display apparatus, including a digital projector for front- or rear-view display or other display device.

Control logic processor 20 (shown in FIGS. 1 and 8) that controls projector 100 operation and handling of image data according to programmed instructions, can be a computer, workstation, dedicated processor, or other logic processor that is in communication with the image-forming components of projector 100. Both dual-view and stereoscopic imaging, resembling each other in a number of aspects, are supported in various of the embodiments shown.

Thus, what is provided is a stereoscopic or dual-view display system that allows customized rendering for multiple simultaneous viewers according to viewer preferences.

PARTS LIST 10 stereoscopic display apparatus
20 control logic processor
24 display surface
30a viewer control
30b viewer control
66a decoding device
66b decoding device
66c decoding device
72l lens
72r lens
80a cluster
80b cluster
90 stereoscopic image
100 projector
A viewer subset
B viewer subset
C viewer subset
L left-eye image
$L_A$ timing for left-eye image to viewer subset A
$L_B$ timing for left-eye image to viewer subset B
L1 left-eye image
L2 left-eye image
R right-eye image
$R_A$ timing for right-eye image to viewer subset A
$R_B$ timing for right-eye image to viewer subset B
$R_C$ timing for right-eye image to viewer subset C
$R1_A$ right-eye image
$R1_B$ right-eye image
$R1_C$ right-eye image
$R2_D$ right-eye image
$R2_E$ fright-eye image
$t_a$ time
$t_b$ time
$t_c$ time
$t_d$ time
$t_e$ time
$t_f$ time
$t_g$ time
$t_h$ time
$w_1$ interval
$w_2$ interval
$w_3$ interval
$w_4$ interval

The invention claimed is:

1. A method for displaying distinct sequences of stereoscopic image pairs to different subsets of viewers, each stereoscopic image pair including a first-eye image and a second-eye image, comprising:
   defining first and second distinct subsets of viewers;
   providing each viewer in the first subset of viewers with a first decoding device for viewing displayed stereoscopic image pairs;

providing each viewer in the second subset of viewers with a second decoding device for viewing displayed stereoscopic image pairs;

displaying, from a single display apparatus, a first sequence of stereoscopic image pairs to the first subset of viewers and a second sequence of stereoscopic image pairs to the second subset of viewers, wherein the first-eye images are common to both the first and second sequences of stereoscopic image pairs, and the second-eye images of the first sequence of stereoscopic image pairs are distinct from the second-eye images of the second sequence of stereoscopic image pairs, the first-eye images and second-eye images being displayed in a repeated sequence that includes:

(i) displaying a first eye image common to the first and second sequences of stereoscopic image pairs during a first time interval;

(ii) displaying a second eye image from the first sequence of stereoscopic image pairs during a second time interval; and (iii) displaying a second eye image from the second sequence of stereoscopic image pairs during a third time interval, wherein the first, second, and third time intervals are non-overlapping;

wherein the first decoding devices are controlled in synchronization with the display apparatus such that the first eyes of the first subset of viewers are blocked from viewing images displayed on the display apparatus during the second and third time intervals, and the second eyes of the first subset of viewers are blocked from viewing images displayed on the display apparatus during the first and third time intervals; and wherein the second decoding devices are controlled in synchronization with the display apparatus such that the first eyes of the second subset of viewers are blocked from viewing images displayed on the display apparatus during the second and third time intervals, and the second eyes of the second subset of viewers are blocked from viewing images displayed on the display apparatus during the first and second time intervals.

2. The method of claim 1 wherein the decoding device comprises an electronically controlled shutter.

3. The method of claim 1 wherein the decoding device comprises at least one polarizer element.

4. The method of claim 1 further comprising providing a third distinct subset of viewers with a third decoding device, and further including displaying a second eye image from a third sequence of stereoscopic image pairs during a fourth time interval in the repeated sequence, the fourth time interval being non-overlapping with the first, second, and third time intervals, wherein the first-eye images of the third sequence of stereoscopic image pairs are the same as the first-eye images in the first and second sequences of stereoscopic image pairs and the second-eye images of the third sequence of stereoscopic image pairs are distinct from the second-eye images of the first and second sequences of stereoscopic image pairs;

wherein the third decoding devices are controlled in synchronization with the display apparatus such that the first eyes of the third subset of viewers are blocked from viewing images displayed on the display apparatus during the second, third and fourth time intervals, and the second eyes of the third subset of viewers are blocked from viewing images displayed on the display apparatus during the first, second and third time intervals; and wherein the first and second decoding devices are further controlled such that both the first and second eyes of the first and second subsets of viewers are blocked from viewing images displayed on the display apparatus during the fourth time interval.

5. The method of claim 1 wherein the defining of the first and second distinct subsets of viewers includes obtaining a measure of a viewer's stereoscopic vision fusing capability.

6. The method of claim 1 wherein the defining of the first and second distinct subsets of viewers includes providing a viewer control for adjusting a horizontal disparity of a displayed stereoscopic image.

7. An apparatus for displaying a first sequence of stereoscopic image pairs to a first subset of viewers and a second sequence of stereoscopic image pairs to a second distinct subset of viewers, each stereoscopic image pair including a first-eye image and a second-eye image, wherein the first-eye images are common to both the first and second sequences of stereoscopic image pairs, and the second-eye images of the first sequence of stereoscopic image pairs are distinct from the second-eye images of the second sequence of stereoscopic image pairs, the apparatus comprising:

a) a display apparatus disposed to form a succession of images on a display surface in a repeated sequence that includes:

(i) displaying a first eye image common to the first and second sequences of stereoscopic image pairs during a first time interval;

(ii) displaying a second eye image from the first sequence of stereoscopic image pairs during a second time interval; and (iii) displaying a second eye image from the second sequence of stereoscopic image pairs during a third time interval, wherein the first, second, and third time intervals are non-overlapping;

b) a control logic processor responsive to stored instructions for providing the succession of images to the display apparatus;

c) a first decoding device provided to each of the viewers in the first subset of viewers that is in communication with the control logic processor and is controlled in synchronization with the repeated sequence of the display apparatus such that the first eyes of the first subset of viewers are blocked from viewing images displayed on the display apparatus during the second and third time intervals, and the second eyes of the first subset of viewers are blocked from viewing images displayed on the display apparatus during the first and third time intervals; and d) a second decoding device provided to each of the viewers in the second subset of viewers that is in communication with the control logic processor and is controlled in synchronization with the repeated sequence of the display apparatus such that the first eyes of the second subset of viewers are blocked from viewing images displayed on the display apparatus during the second and third time intervals, and the second eyes of the second subset of viewers are blocked from viewing images displayed on the display apparatus during the first and second time intervals.

8. The apparatus of claim 7 further comprising at least one viewer control for adjusting the horizontal disparity for at least the first subset of viewers.

9. The apparatus of claim 7 further comprising a third decoding device provided to each viewer in a third subset of viewers;

wherein a second eye image from a third sequence of stereoscopic image pairs is displayed during a fourth time interval in the repeated sequence, the fourth time interval being non-overlapping with the first, second, and third time intervals, wherein the first-eye images of the third sequence of stereoscopic image pairs are the same as the first-eye images in the first and second sequences of stereoscopic image pairs and the second-eye images of the third sequence of stereoscopic image pairs are distinct from the second-eye images of the first and second sequences of stereoscopic image pairs;

wherein the third decoding device is is in communication with the control logic processor and is controlled in synchronization with the repeated sequence of the display apparatus such that the first eyes of the third subset of viewers are blocked from viewing images displayed on the display apparatus during the second, third and fourth time intervals, and the second eyes of the third subset of viewers are blocked from viewing images displayed on the display apparatus during the first, second and third time intervals; and wherein the first and second decoding devices are further controlled such that both the first and second eyes of the first and second subsets of viewers are blocked from viewing images displayed on the display apparatus during the fourth time interval.

10. The apparatus of claim 7 wherein the first decoding device comprises electronically controlled shutter glasses.

11. The apparatus of claim 7 wherein the first decoding device comprises polarized glasses.

12. The apparatus of claim 7 wherein the first decoding device comprises at least one spectral filter.

13. A method for displaying distinct sequences of stereoscopic image pairs to different subsets of viewers, each stereoscopic image pair including a first-eye image and a second-eye image, comprising:

a) defining first, second, and third distinct subsets of viewers;

b) providing each viewer in the first subset of viewers with a first decoding device for viewing displayed stereoscopic images, providing each viewer in the second subset of viewers with a second decoding device for viewing displayed stereoscopic image pairs, and providing each viewer in the third subset of viewers with a third decoding device for viewing displayed stereoscopic image pairs;

c) displaying, from a single display apparatus, a first sequence of stereoscopic image pairs to the first subset of viewers, a second sequence of stereoscopic image pairs to the second subset of viewers and a third sequence of stereoscopic image pairs to the third subset of viewers, wherein the first-eye images of the first sequence of stereoscopic image pairs are the same as the first-eye images of the second sequence of stereoscopic image pairs, and the second-eye images of the first sequence of stereoscopic image pairs are distinct from the second-eye images of the second sequence of stereoscopic image pairs, the first-eye images and second-eye images being displayed, in a repeated sequence that includes:

(i) displaying a first-eye image common to the first and second sequences of stereoscopic image pairs during a first time interval;

(ii) displaying a second-eye image from the first sequence of stereoscopic image pairs during a second time interval; and (iii) displaying a second-eye image from the second sequence of stereoscopic image pairs the second eye of the second subset of viewers during a third time interval;

(iv) displaying a first-eye image from the third sequence of stereoscopic image pairs during a fourth time interval; and (v) displaying a second-eye image from the third sequence of stereoscopic image pairs during a fifth time interval, wherein the first, second, third, fourth, and fifth time intervals are respectively non-overlapping;

wherein the first decoding devices are controlled in synchronization with the display apparatus such that the first eyes of the first subset of viewers are blocked from viewing images displayed on the display apparatus during the second, third, fourth and fifth time intervals, and the second eyes of the first subset of viewers are blocked from viewing images displayed on the display apparatus during the first, third, fourth and fifth time intervals;

wherein the second decoding devices are controlled in synchronization with the display apparatus such that the first eyes of the second subset of viewers are blocked from viewing images displayed on the display apparatus during the second, third, fourth and fifth time intervals, and the second eyes of the second subset of viewers are blocked from viewing images displayed on the display apparatus during the first, second, fourth and fifth time intervals; and wherein the third decoding devices are controlled in synchronization with the display apparatus such that the first eyes of the third subset of viewers are blocked from viewing images displayed on the display apparatus during the first, second, third and fifth time intervals, and the second eyes of the third subset of viewers are blocked from viewing images displayed on the display apparatus during the first, second, third and fourth time intervals.

14. The method of claim 13 wherein the first, second and third decoding devices include electronically controlled shutter glasses.

15. The method of claim 14 wherein one or more of the electronically controlled shutter glasses has polarized lenses.

16. The method of claim 13 wherein the display apparatus is a projector that projects images onto a display screen.

* * * * *